United States Patent
Fu et al.

(10) Patent No.: US 9,064,157 B2
(45) Date of Patent: Jun. 23, 2015

(54) PEDESTRIAN DETECTION SYSTEMS AND METHODS

(71) Applicants: Li-Chen Fu, Taipei (TW); Pei-Yung Hsiao, Taipei (TW); Yi-Ming Chan, Taipei (TW); Min-Fang Lo, Zhongli (TW)

(72) Inventors: Li-Chen Fu, Taipei (TW); Pei-Yung Hsiao, Taipei (TW); Yi-Ming Chan, Taipei (TW); Min-Fang Lo, Zhongli (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 448 days.

(21) Appl. No.: 13/689,770

(22) Filed: Nov. 30, 2012

(65) Prior Publication Data

US 2014/0152821 A1 Jun. 5, 2014

(51) Int. Cl.
*H04N 7/18* (2006.01)
*G06K 9/00* (2006.01)
*G06K 9/46* (2006.01)

(52) U.S. Cl.
CPC ........ *G06K 9/00805* (2013.01); *G06K 9/00369* (2013.01); *G06K 9/4642* (2013.01)

(58) Field of Classification Search
USPC .......................................................... 348/148
See application file for complete search history.

(56) References Cited

U.S. PATENT DOCUMENTS 8,649,564 B2 * 2/2014 Lo et al. .................. 382/104
8,908,921 B2 * 12/2014 Ishikawa et al. ............... 382/103

* cited by examiner

*Primary Examiner* — Thai Tran
*Assistant Examiner* — Nien-Ru Yang
(74) *Attorney, Agent, or Firm* — Chun-Ming Shih

(57) ABSTRACT

A pedestrian detection system and method includes: dividing an image to a plurality of granules, and counting magnitude difference value of each granule in diagonal orientation to obtain features of HOGG. And the HOGG and the HOG captured can work together to improve the detection rate and reduce the false alarm rate, which is the ultimate goal of the vision based pedestrian detection.

7 Claims, 5 Drawing Sheets

PEDESTRIAN DETECTION SYSTEMS AND METHODS

BACKGROUND OF THE INVENTION

1. Field of the Invention

The present invention is related to a pedestrian detection system and method, and more particularly, to a pedestrian detection system and system applying histogram of gradient of granule feature of an image to enhance the pedestrian detection rate and detection precision.

2. Description of the Related Art

There is a variety of imaging driving safety devices applying in the pedestrian detection nowadays. These safety devices with different designs and manufacture processes can generate different results.

Traditionally, the existing technology uses template matching to achieve the purpose of detecting the pedestrian. The existing technology mainly constructs human form templates or modules with different angles and attitudes to compare with the detection image so as to achieve the pedestrian detection. For the features of the appearance of human contour, the existing technology adopts the silhouette or the edge image to represent the human contour, and converts the silhouette or the edge image to a distance transform image. In order to overcome the translation, scale and orientation variations of the object more effectively, it develops the human contour feature picture containing wavelet coefficients. Additionally, histogram of oriented gradients (HOG) is used to represent the feature of human contour, and the machine learning method is used as the core of the imaging pedestrian detection to perform the identification and the classification by the support vector machine (SVM) so as to effectively identify the pedestrian or non-pedestrian.

Therefore, HOG can better overcome the variation of the human contour to achieve the better detection result. The calculation of HOG is to divide the image to a plurality of blocks, and then count the amount of magnitude of the pixel gradient in any orientation in each block so as to form a histogram of oriented gradients (HOG). HOG has a strong description capability for the edge information, and also adapts to the edge shift and the slightly rotation due to the counting calculation.

However, HOG lacks the texture information because of the property of the counting calculation. For example, HOG can not effectively identify a single complete line or complicate lines. Thereby, HOG will make mistake when the human appears in a clutter environment.

Accordingly, a system and method for solving the aforementioned problems is needed.

SUMMARY OF THE INVENTION

An object of the present invention is to provide a pedestrian detection system, the pedestrian detection system comprises: a camera module, mounted in a vehicle, and providing a image captured around the vehicle; and a process module, having two feature capturing modules and a classifier, and receiving and analyzing the image so as to determine whether having a pedestrian in the image, and wherein each feature capturing module adopts histogram of oriented gradients and histogram of gradient of granule feature to capture features of the image.

Another object of the present invention is to provide a pedestrian detection method, comprising: capturing a image from a camera module; capturing gradient of granule features of the image, and converting the image to a HOGG image; and classifying the HOGG image by a classifier for determining whether having a pedestrian. Specifically, the method of capturing HOGG of the image further comprises: obtaining a magnitude average value of each granule; obtaining a magnitude average difference value in diagonal orientation of the each granule in the plurality of cells; taking a block as unit and counting feature vectors of each block so as to obtain the HOGG image. Wherein the HOG is captured from the image, and the image is converted to a HOG image, and then the HOG image and the HOGG image are combined to a feature image containing HOG+HOGG, and therefore, the classifier generates an accurate classification result of the pedestrian detection.

BRIEF DESCRIPTION OF THE DRAWINGS

The invention, as well as its many advantages, may be further understood by the following detailed description and drawings in which.

DETAILED DESCRIPTION OF THE INVENTION

Reference will now be made to the drawings to describe exemplary embodiments of the present of a driver assistance system and method for vision based pedestrian detection, in detail. The following description is given by way of example, and not limitation.

Figure 1A:
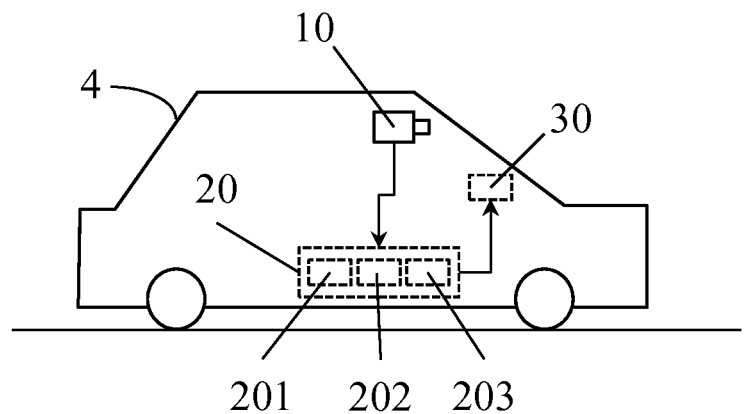
FIGS. 1a and 1b illustrate schematically diagrams of a pedestrian detection system of the present invention.
Figure 1B:
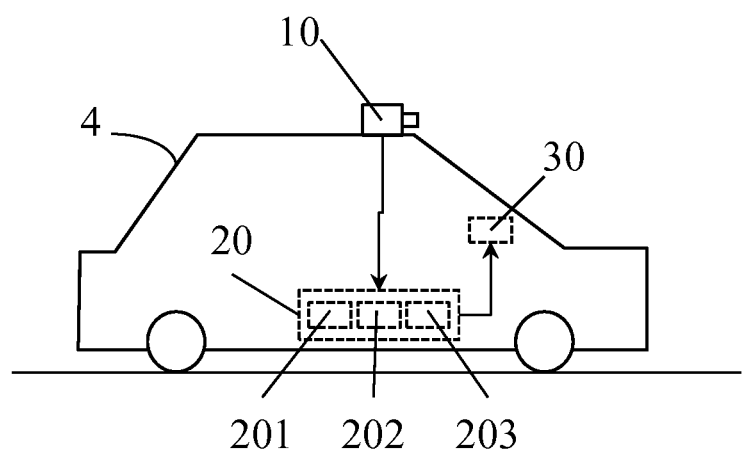

Referring to FIGS. 1a and 1b, a pedestrian detection system is provided according to a preferred embodiment of the present invention. The pedestrian system comprises a camera module 10 and a process module 20.

The camera module 10, which is mounted a vehicle 4, captures an image around the vehicle 4.

The process module 20 has two feature extraction modules 201, 202 and a classifier 203, and receiving and analyzing the image so as to determine whether having a pedestrian in the image, and wherein each feature capturing module adopts the histogram of oriented gradients and the histogram of gradient of granule feature to capture features of the pedestrian.

In the preferred embodiment, besides the camera module 10 is mounted in a driving mirror in the vehicle 4 to capture the image in front of the vehicle 4 (as shown in FIG. 1a), the camera module 10 also can be mounted at back of the vehicle, or in roof of the vehicle to capture the images in any direction, as shown in FIG. 1b.

In the preferred embodiment, the process module 20 generates a display signal according to a analyze result of the image, and sends the display signal to the display module 30. Thereby, the process module 20 not only shows the image, but also marks the pedestrian illustrated in the image.

In the preferred embodiment, the feature capturing module 201, 202 in the process module 20 respectively adopts histogram of oriented gradients (HOG) and histogram of gradient of granule feature (HOGG) to capture features of the image, and the classifier 203 adopts a supported vector machine (SVM) to determine whether having pedestrians in the image.

Figure 2:
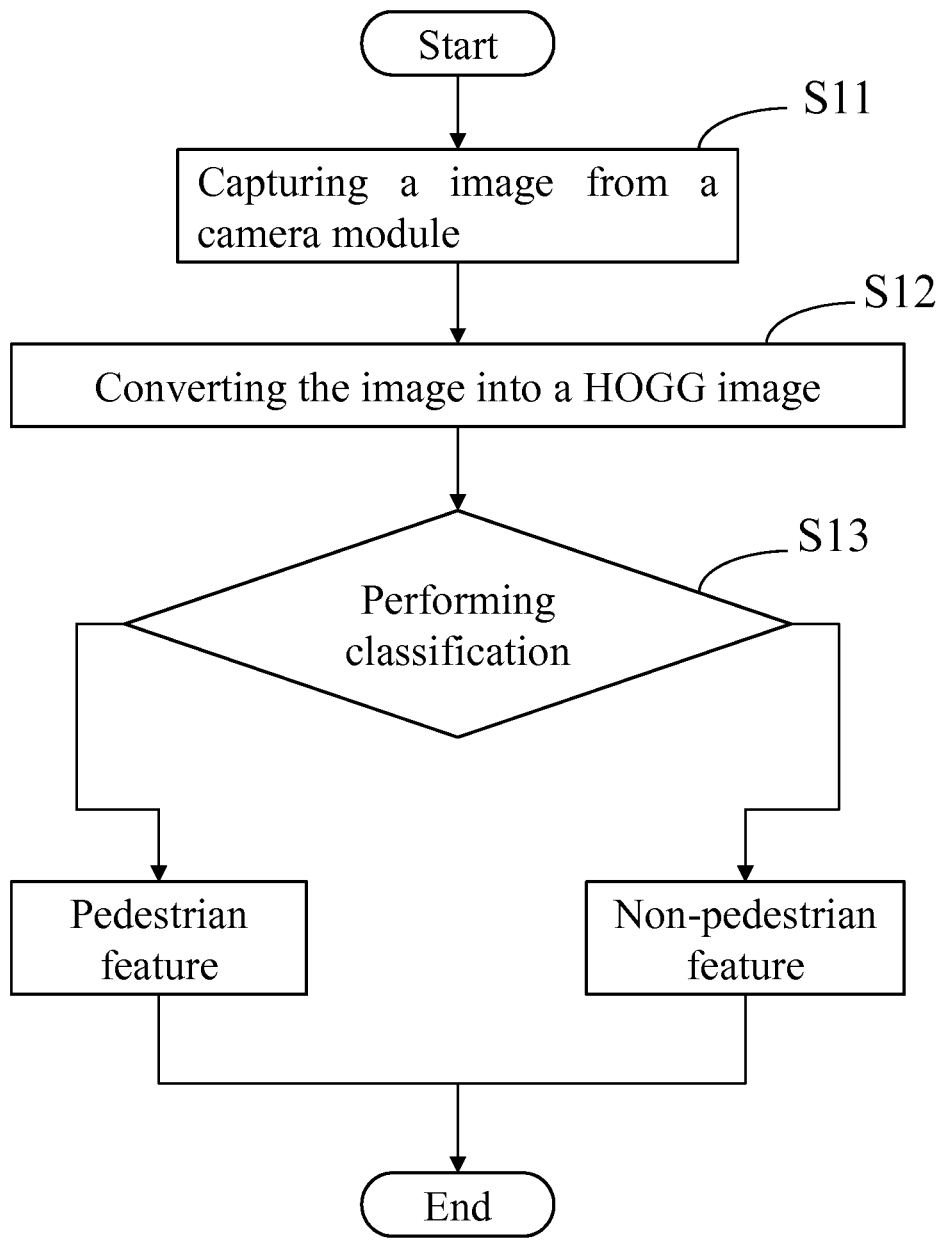
FIG. 2 illustrates a flow chart of a pedestrian detection method (HOGG) of the present invention.

Referring to FIG. 2, a pedestrian detection method is provided according to a preferred embodiment of the present invention, and steps of the pedestrian detection methods as follow.

Step S11: capturing an image from a camera module 10. Then, proceeding to Step S12.

Step S12: capturing gradient of granule feature of the image by a process module 20, and converting the image to a HOGG image. Then proceeding to Step S13.

Step S13: classifying the HOGG image by a classifier in the process module 20, and determining whether having features of the pedestrian in the HOGG image.

Figure 3:
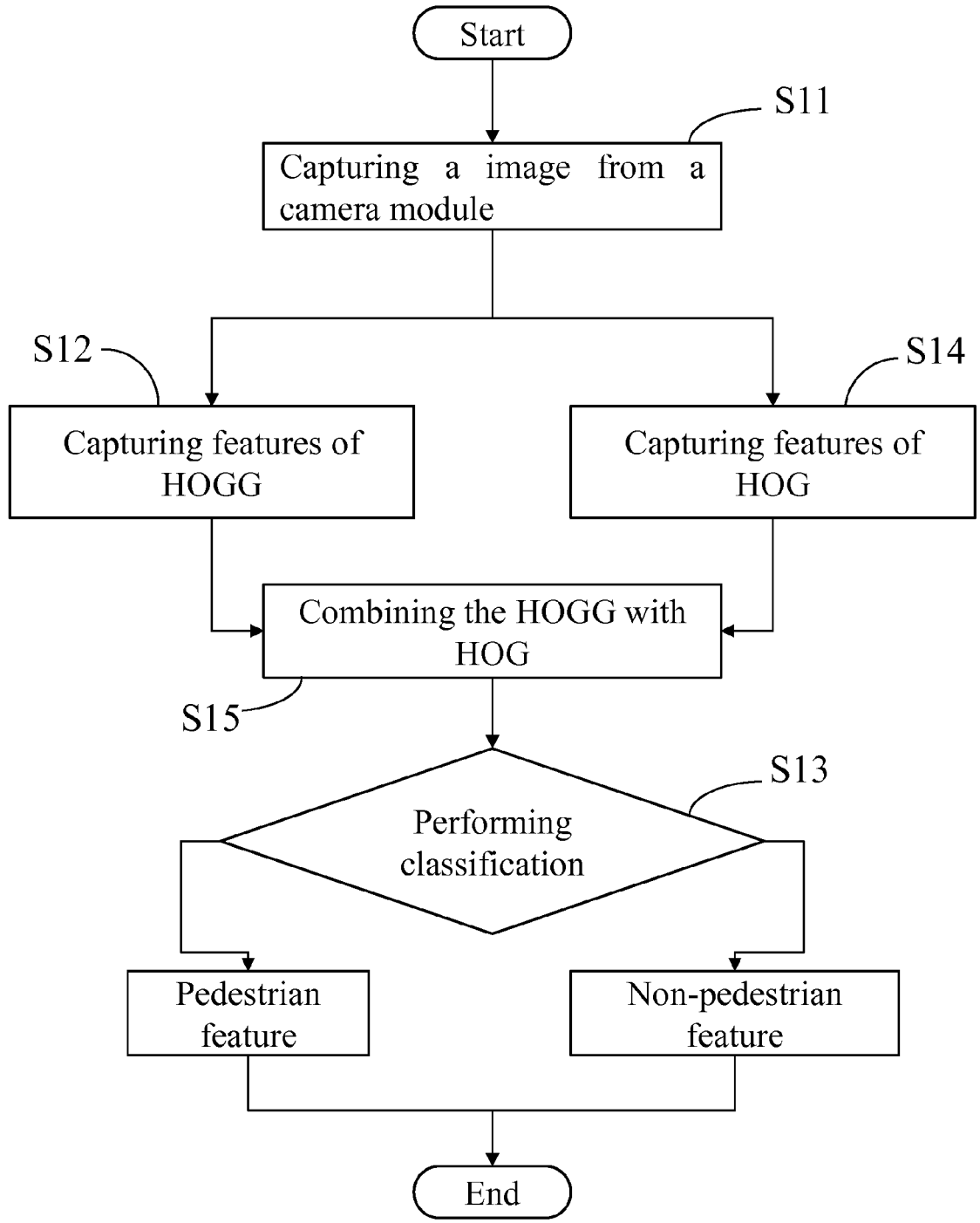
FIG. 3 illustrates a flow chart of a pedestrian detection method (HOGG+HOG) of the present invention.
Figure 4:
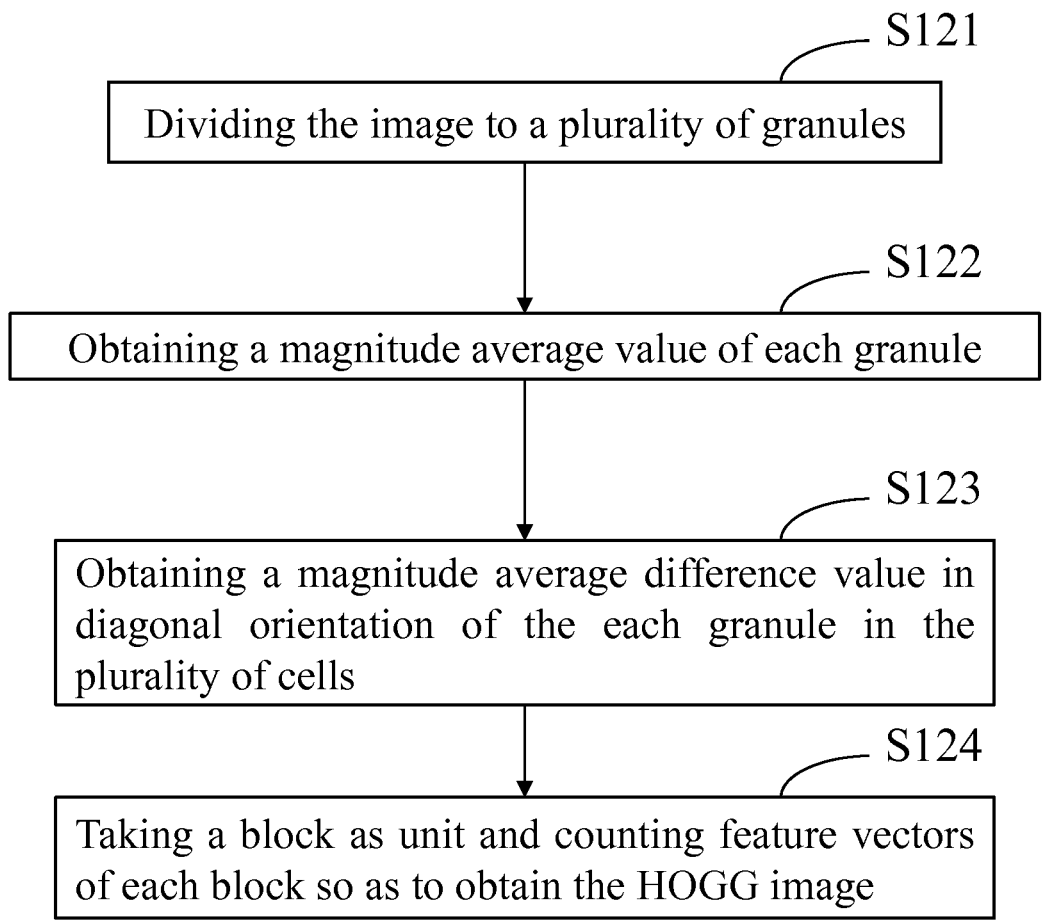
FIG. 4 illustrates an operation flow chart of HOGG of the present invention.

In the preferred embodiment, when the process module 20 captures the gradient of granule feature in the image signal in step S12, it simultaneously performs Step 14 (as shown in FIG. 3). As shown in FIG. 3, in step S14, the process module 20 captures the feature of oriented gradient in the image signal, and converts the image to HOG features, and then the HOG feature and the HOGG feature are catenated (Step S15), that means, the dimension of the combined feature is equal to the dimension of the feature of HOGG and HOG.

Figure 5A:
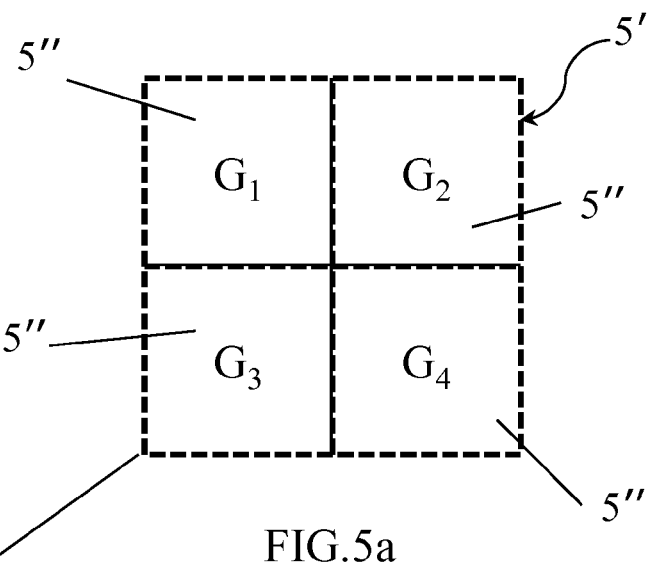
FIG. 5a illustrates a unit consisting of a plurality of granules.

As far as HOGG is concerned, the image is divided to a plurality of cells 5', and each cell 5' further comprises a plurality of granules 5", as shown in FIG. 5, a single cell 5' is composed of 2×2 cells 5" (Step S121). $G_1$ represents area of the each cell 5", for example, area $G_1$, $G_2$, $G_3$ and $G_4$ described in FIG. 5a, and supposing that magnitude of the image in the coordinates (u, v) represents I(u, v), and the formula as below is applied to obtain the magnitude average value of each granule $f(G_1)$ (Step S122). The formula is:

$$f(G_i) = \frac{1}{|G_i|} \sum_{(u,v) \in G_i} I(u, v) \qquad (1)$$

Wherein $|G_i|$ represents the size of area of each cell 5". Subsequently, after obtaining the magnitude average value of each granule 5", it obtains feature vector of each granule 5" by $f(G_1)-f(G_4)$ and $f(G_2)-f(G_3)$, and the feature vector consists of a magnitude and a orientation, as below.

$$\text{Magnitude: } |\nabla \text{Cell}| = \sqrt{(f(G_1)-f(G_4))^2 - (f(G_2)-f(G_3))^2} \qquad (2)$$

$$\text{Orientation: } \theta_{Cell} = a\tan 2(f(G_1)-f(G_4), f(G_2)-f(G_3)) \qquad (3)$$

Figure 5B:
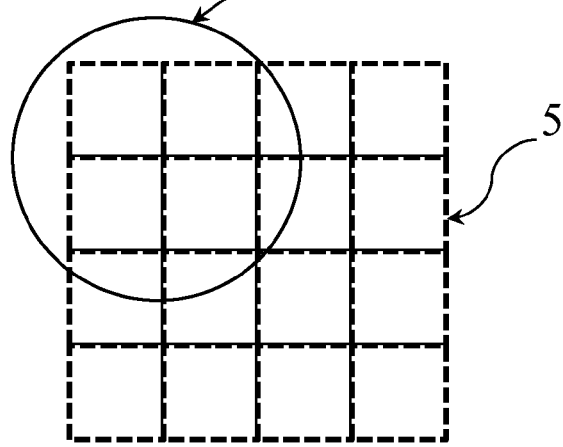
FIG. 5b illustrates a block consisting of a plurality of units.

Supposing that a block 5 consists of 4×4 cells, as shown in FIG. 5b. The block 5 can take the cell 5' as the unit to perform the scan so as to box select out 9 cells 5' to perform the calculation, and obtain 9 feature vectors. If the block 5 is located in angle range 0 degree~180 degree, the block 5 is divided to 9 portions per 20 degree, and the 9 portions are used as 9 bins, and it performs the voting according to orientation of feature vector of each cell 5', and the magnitude of the feature vector represents the vote, and the vote is counted in the each block 5. In another embodiment, a 128×64 pixel image is divided to overlapping 16×16 pixel block 5, to generate 15×7 voting results, that means, the dimension of the feature vector is 105 time 9 given a 128×64 pixel image.

Thereby, the image containing cells 5' may be obtained a representative feature vector, and the image is converted to the HOGG feature by the regional counting (Step S124).

Additionally, as far as the HOG is concerned, it also divides the image to cells 5', and the combination of the cells 5' forms the block 5 to obtain the feature vector. The difference is that HOG uses the difference of the magnitude average value between the single cell 5' and the other cells 5' around the single cell to obtain the feature vector. And it also can use the vote counting to obtain the HOG feature, and the methods and steps about HOG will not discussed herein.

Moreover, as shown in FIG. 3, the HOGG feature and the HOG feature are combined to a feature of HOGG+HOG by a feature combination module (Step S15).

In the preferred embodiment, it adopts a training template to perform the training in advance before performing the image classification by the classifier 203. Specifically, the training samples comprise the pedestrian images (the positive example image) and the non-pedestrian images (the negative example image). The classifier 203 determines that there is a pedestrian in the image according to the pedestrian image, and outputs a positive value signal; otherwise, the classifier 203 determines that there is no pedestrian in the image according to the non-pedestrian image, and outputs a negative value signal.

In the preferred embodiment, the classifier 203 uses a SVM to perform the training in advance at off-line, and builds a multi-dimensional place by the training template, and builds a hyper plane between the positive example image and the negative example image as the judgment of the imaging pedestrian. However, the SVM is a used as a tool for classification, and the operation method of SVM will not discussed herein.

Moreover, the process module 20 mark the pedestrian location in the image according to the positive signal and the negative signal and it performs the display by the display module 30 when the classifier 203 outputs the positive signal and the negative signal.

Therefore, the pedestrian detection system and method of the present invention uses the camera module 10 to capture the image, and uses the process module 20 to capture the features and compare the classification, so as to determine whether having the features of the pedestrian. Due to the HOG cannot solve the clutter line environment, the present invention simultaneously take the advantage of the HOGG technology. The HOGG technology of the present invention comprises: the image is divided to a plurality of granules in each cell 5', and a magnitude average difference value in diagonal orientation of the each granule in the plurality of cells is obtained to obtain the feature vector of each cell 5'. Then, the image is converted to HOGG feature by counting the block 5, and the HOG feature and HOGG feature are combined to an image containing HOGG+HOGG to enhance the quality of the pedestrian detection.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A pedestrian detection system, comprising:
a camera module, mounted in a vehicle, configured to capture image around the vehicle;
a process module, having
two feature capturing modules that capturing gradient of granule features of the image, and converting the image to a histogram of gradient of granule feature (HOGG) feature comprising:
dividing the image to a plurality of granules;
obtaining a magnitude average value of each granule;
obtaining a magnitude average difference value in diagonal orientation of the each granule in the plurality of cells;
wherein each feature capturing module adopts histogram of oriented gradients and histogram of gradient of granule feature to capture features of the image; and a classifier that receives and analyzes the image for classifying the HOGG feature to determine whether having a pedestrian in the image.

2. The pedestrian detection system of claim 1, wherein the classifier performs classifications to determine whether having the pedestrian in the image.

3. The pedestrian detection system of claim 1, wherein the process module uses a display module to display results of the image analyzed.

4. A pedestrian detection method, comprising:
capturing image from a camera module;
capturing gradient of granule features of the image, and converting the image to a HOGG feature, wherein the step further comprises:
dividing the image to a plurality of granules;
obtaining a magnitude average value of each granule;
obtaining a magnitude average difference value in diagonal orientation of the each granule in the plurality of cells;
taking a block as unit and counting feature vectors of each block so as to obtain the HOGG feature; and
classifying the HOGG feature by a classifier for determining whether having a pedestrian.

5. The pedestrian detection method of claim 4, wherein size of the each granule is smaller than the each unit, and size of the unit is smaller than the each block.

6. The pedestrian detection method of claim 4, wherein the step of "capturing gradient of granule features of the image, and converting the image to a HOGG feature" further comprises:
Simultaneously capturing a histogram of oriented gradients (HOG) feature, and converting the image to a HOG feature.

7. The pedestrian detection method of claim 6, wherein the HOG feature and the HOGG feature are combined by a combination module.

* * * * *